United States Patent [19]
Steiner

[11] 3,782,436
[45] Jan. 1, 1974

[54] CLINCH STUD

[76] Inventor: Joseph Steiner, 16 Forest Glen Rd., Valley Cottage, N.Y.

[22] Filed: July 21, 1972

[21] Appl. No.: 274,086

[52] U.S. Cl. ............................................. 151/41.73
[51] Int. Cl. ............................................ F16b 39/282
[58] Field of Search ................................. 151/41.73

[56] References Cited
UNITED STATES PATENTS
3,127,919   4/1964   Swanstrom...................... 151/41.73
D219,953   2/1971   Ernest.............................. 152/41.73

*Primary Examiner*—Marion Parsons, Jr.
*Attorney*—Carl E. Johnson et al.

[57] ABSTRACT

A self-clinching stud has a head and a threaded shank adapted to be secured in sheet material. In the locality integrally adjoining the head and shank, stepped concave lands alternate circumferentially with convex unstepped lands. This configuration produces a flow in sheet metal, when the stud is pressed into a hole having a diameter about equal to the shank diameter and less than that of the lands, that holds the stud against unscrewing as well as axial pull out.

5 Claims, 6 Drawing Figures

PATENTED JAN 1 1974  3,782,436

3,782,436

CLINCH STUD

BACKGROUND OF THE INVENTION

This invention relates to headed fasteners. More particularly it is concerned with the provision of threaded studs adapted to be secured in sheet material by producing an interlocking material flow upon an insertion force being axially applied to the heads of the studs. The head of the inserted stud is thus commonly locked flush with the surface of the material and resists torque and axial dislodging A number of self-clinching fasteners are known to exist. Perhaps the approach most closely involving structure resembling that of the present invention is disclosed in U.S. Pat. No. 3,127,919 issued Apr. 7, 1964 to K. A. Swanstrom. In that arrangement it is necessary when the stud is formed with its usual threads that two or more annular undercut recesses also be simultaneously rolled on the shank in a critical manner which involves complications. An earlier anchoring means relying on deformation of one of two interdriven members, but not involving thread formation is disclosed for instance in U.S. Pat. No. 2,358,728 to Miller, wherein an axial key slot is provided for reception of the displaced metal.

SUMMARY OF THE INVENTION

A main object of the present invention in view of the foregoing is to provide an improved stud type fastener which shall be economical to manufacture and capable of clinching itself when driven into a material.

Another object of this invention is to provide a threaded stud having a head portion adapted for flush mounting in a panel, the stud being entirely of a configuration produceable on standard heading and thread rolling machinery.

To these ends, and as herein shown, a feature of the invention resides in the provision of a novel headed stud having, intermediate the head and threaded shank portions, a circumferential series of uniformly spaced, axially stepped fluted localities. Preferably, as illustrated, there is thus provided beneath a circular head and within a diameter less than that of the head but greater than that of the root diameter of the threaded shank, a plurality of radially projecting lands having a convex outer surface, the lands being disposed respectively between the circumferentially adjacent stepped localities. The latter are desirably four in number and sized to flow sufficient metal (assuming the mounting structure is of metal) during installation into four cavities defined in part by the root diameter of the shank thread and an adjacent stepped land.

BRIEF DESCRIPTION OF THE DRAWINGS

The above and other features of the invention will now be more particularly described in connection with an illustrative embodiment, and with reference to the accompanying drawings thereof, in which.

DESCRIPTION OF PREFERRED EMBODIMENT

Figure 1:
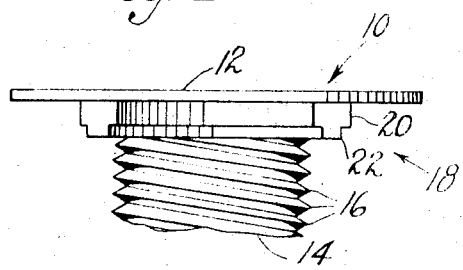
FIG. 1 is a view in elevation of a portion of a self-clinching stud having a head, novel collar portion, and threaded stem.
Figure 2:
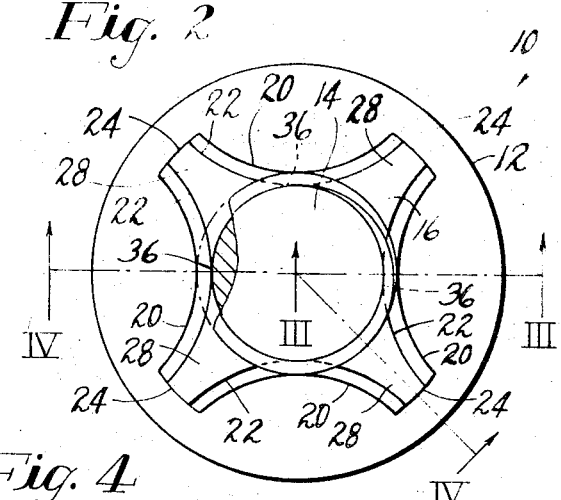
FIG. 2 is an end view of the stud of FIG. 1, part of the stem being removed to show a thread root portion.
Figure 3:
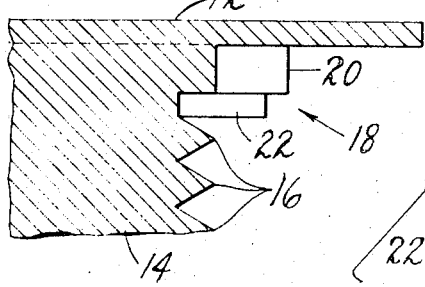
FIG. 3 is a radial section taken on line III—III of FIG. 2.

FIGS. 1 and 2 depict a clinch stud generally designated 10 comprising a head 12 and an integral threaded stem 14 projecting therefrom. The stem has threads 16 roller thereon. In a locality integrally adjoining the end threads 16 and the flat underside of the head 12 a symmetrical collar portion 18 is formed as by cold heading as next described in coaxial relation to the head and stem.

The portion 18 has a diameter at all points less than that of the circular head 12 and at its smallest dimension is substantially equal to that of the pitch diameter of the stem 14. The collar 18 comprises four substantially identical sectors each including an outer concave land 20 which is axially undercut or stepped down to provide an inner concave land 22. Radially outer extremities of the lands 20,22 respectively extend to convex, circumferentially smaller portions 24 of the collar which are not stepped but lie substantially on the surface of a cylinder. The axial thickness of each portion 24 is substantially equal to the sum of the thicknesses of the juxtaposed lands 20 and 22. The inner land 22 is substantially tangential with the pitch diameter circle of the stem 14 as shown in FIG. 2. A work piece for instance, a metal sheet W (FIGS. 4 – 6) has a receiving bore the wall 26 of which is formed with a diameter substantially equal to the outside diameter of the threads 16.

Figure 4:
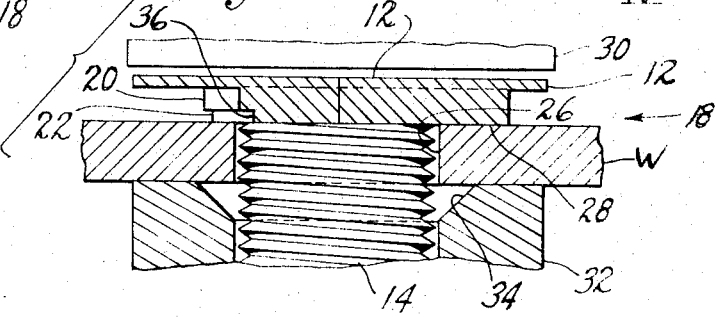
FIG. 4 is a section taken on the broken line IV—IV of FIG. 2, a pair of installing tools being shown in an initial relation to sheet material in a bore of which the fastener is to be clinched.
Figure 5:
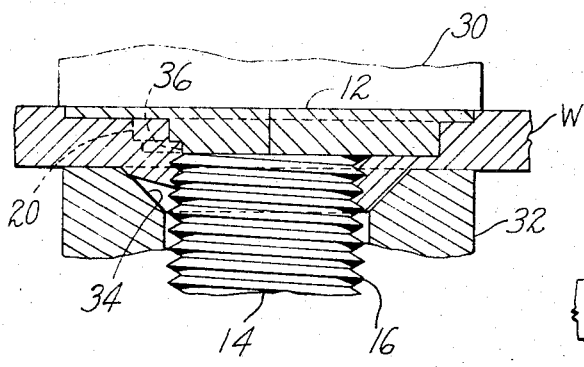
FIG. 5 is a view corresponding to FIG. 4 and showing the stud in clinched position.
Figure 6:
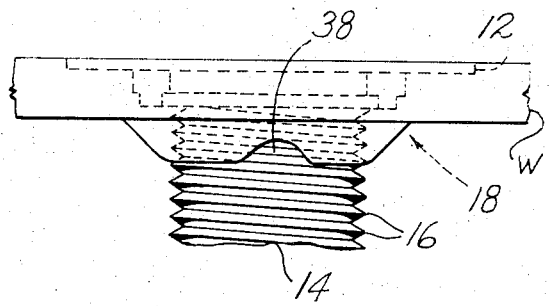
FIG.6 is a view corresponding to FIG. 1 showing the installed stud.

Upon inserting the clinch stud 10 in the hole in the sheet metal W as shown in FIG. 4 until radially projecting undersurfaces 28 of the respective portions 24 engage a side of the sheet, a punch 30 (FIGS. 4 and 5) or other suitable installing tool may be brought to bear axially on the head 12 against resistance provided by a back-up member such as an anvil 32 sometimes recessed as indicated at 34. The exterior of the head will generally be mounted substantially flush with a surface of the sheet W, as shown in FIG. 5. During the installation the surfaces 28 are first axially to displace metal from the wall 26 of the sheet, followed by engagement of undersurfaces of the outer lands 20 with the sheet, and then embedment of the head 12 to flow material radially into the groove or grooves of the adjacent threads 16 and into spaced cavities 36 (FIG. 2) defined by the inner concave lands 22, respectively, as shown in FIG. 5. Upon withdrawing the punch 30 and the anvil 32, the clinch stud will be tightly anchored in the sheet W as shown in FIG. 6. It may be noted in the annularly displaced metal rim of the sheet W that four equally spaced, semi-circular recesses 38 (one only shown in FIG. 6) are formed and angularly correspond with the cavities 36. These recesses receive metal flow to increase resistance to turning torque.

It will be found that the sheet displacing areas afforded by the successively acting surfaces 28, undersurfaces of the lands 20 and undersurface of the head 12 are progressively larger in the order mentioned and hence apply successively decreasing pressure per unit area, assuming the total thrust force is constant. The clinched stud effectively resists axial pullout, shearing force, and turning torque. While the collar portion 18 may have more or less than four sectors of the configuration described, it is generally found that four provide satisfactory anchorage in metal materials.

Having thus described my invention, what I claim as new and desire to secure by Letters Patent of the United States is:

1. A self-clinching stud having a head, a threaded stem, and an integral collar portion coaxially adjoining the stem and an undersurface of the head, said collar portion comprising a plurality of circumferential sectors respectively including an outer concave land adjacent to the head and stepped down to provide an inner concave land, extremities of said concave collar lands respectively extending to convex collar surfaces the diameter of which is less than that of said head and greater than that of the outisde diameter of the threaded stem.

2. A stud as in claim 1 wherein the sectors between midpoints of the successive concave lands are quadrants.

3. A stud as in claim 1 wherein the axial thickness of the outer concave land sector plus that of the inner concave land sector substantially equals the axial thickness of said collar surfaces, 4. A stud as in claim 1 wherein said convex collar surfaces are cylindrical, and the underside of the concave lands intersects the adjacent inner concave lands at an angle of about 90°.

5. A stud as set forth in claim 3 further characterized in that the circumferential proportions of the four convex surface portions to the concave lands is such as to provide displaced material from the wall of a hole in which the stud stem is axially thrust, which material substantially corresponds in volume to that of the groove of an adjacent stem end threads plus the volume of the four cavities defined by said concave lands with said end threads.

* * * * *

UNITED STATES PATENT OFFICE
CERTIFICATE OF CORRECTION

Patent No. 3,782,436            Dated January 1, 1974

Inventor(s) Joseph Steiner

It is certified that error appears in the above-identified patent and that said Letters Patent are hereby corrected as shown below:

On the title page, after name and address of inventor, insert --Assignee: USM Corporation, Boston, Massachusetts--

Signed and sealed this 17th day of September 1974.

(SEAL)
Attest:

McCOY M. GIBSON JR.            C. MARSHALL DANN
Attesting Officer            Commissioner of Patents